Figure 1:
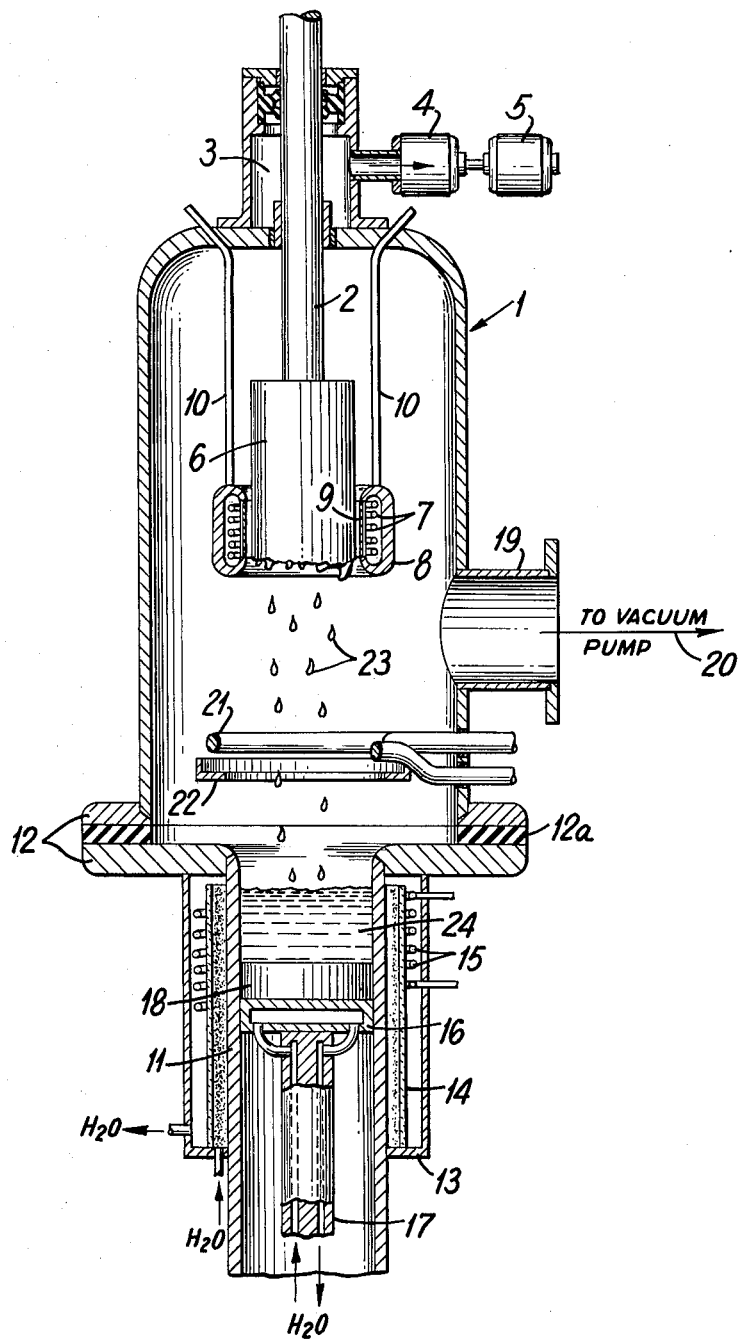

Dec. 28, 1965  A. BUSSARD ETAL  3,226,223
METHOD AND APPARATUS FOR MELTING METALS BY INDUCTIVE
HEATING AND ELECTRON BOMBARDMENT
Filed April 20, 1961  2 Sheets-Sheet 1

INVENTORS.
ADRIEN BUSSARD
HELMUT GRUBER
HERBERT STEPHAN

BY  Klein and Poddlon

ATTORNEYS

United States Patent Office 3,226,223
Patented Dec. 28, 1965

3,226,223
METHOD AND APPARATUS FOR MELTING METALS BY INDUCTIVE HEATING AND ELECTRON BOMBARDMENT
Adrien Bussard, La Celle St. Cloud, France, and Helmut Gruber and Herbert Stephan, Hanau am Main, Germany, assignors to W. C. Heraeus G.m.b.H., Hanau am Main, Germany, a corporation of Germany
Filed Apr. 20, 1961, Ser. No. 104,329
Claims priority, application Germany, May 21, 1960, H 39,496
13 Claims. (Cl. 75—10)

The present invention relates to a method and an apparatus for melting metals in a high vacuum by heating the respective metal by induction and by subjecting the molten metal to an electron bombardment.

In the known method of melting metals in the form of consumable electrodes in a high vacuum by heating the electrode by induction, the molten metal dripping off the electrode is gradually built up in a water-cooled pipe-shaped crucible to produce an ingot of a form similar to a stalactite. Such an ingot is unsuitable for any further mechanical treatment since it is too inhomogeneous and full of shrink holes and cavities. In order to attain an ingot which is sufficiently homogeneous and suitable for mechanical treatment, it is therefore necessary to melt the stalactitelike ingot once more in an arc furnace. Obviously, this double melting operation involves a considerable expense for the necessary apparatus as well as involving a great waste of time, and for these reasons it is not very suitable for melting large amounts of metal.

It is an object of the present invention to improve and simplify the known method so as to permit the melting operation to be carried out at a considerably lower cost.

It is a further object of the invention to provide a method of melting a consumable electrode in a high-vacuum furnace in a manner so as to attain a superior ingot which without requiring any remelting, is very homogeneous by being free of cavities and impurities, and which has the additional advantage of being almost completely degassed.

A further object of the invention is to provide a method which permits a considerable increase in production within less time and by means of simpler and less expensive apparatus than were required by the previous method.

According to the present invention it has been found that the various disadvantages of the previous method may be overcome by additionally heating the metal, which has been melted off a consumable electrode by being heated by an induction coil, by subjecting it to an electron bombardment. By such an electron bombardment the molten metal will be heated to a temperature which is equal to or slightly higher than the melting temperature of the metal. This additional heating of the molten metal by an electron bombardment within a high vacuum produces the above-mentioned advantage that the ingot will not only be free of cavities and substances causing it to have an inhomogeneous structure, but that the metal will also be almost completely degassed.

An electron bombardment of the ingot has proved to be the most suitable manner of heating the same since, by heating the ingot directly, it avoids the disadvantages of the methods of heating it by induction or by resistance inasmuch as the crucible which collects the molten metal dripping from the consumable electrode is then likewise heated so that a considerable amount of energy will be lost. Such a direct and concentrated heating of the ingot according to the invention is possible by focussing the electrons which are emitted from the cathode in such a manner that they will impinge merely upon the ingot and not upon the walls of the crucible and will therefore only heat the molten metal within the crucible but not the crucible itself. The new method has the further advantage that the electrons which are vaporized from the molten drops of metal during the fall of the latter from the consumable electrode to the crucible are also accelerated in the direction toward the crucible. These electrons will then hit upon the molten metal, deliver their energy thereto, and thus contribute considerably toward heating of the metal in the crucible.

The melting furnace according to the invention is equipped with a vacuum pump unit of a sufficient power to insure that a high vacuum will be maintained in the furnace including the crucible during the entire melting process so that the gases emerging from the molten metal will be quickly evacuated and will thus not cause any luminous or arc discharges.

According to one embodiment of the invention, the electron source preferably consists of an annular cathode, although in place thereof it is obviously also possible to employ one or several electron generators. In order to reduce the possibility of the occurrence of a luminous or arc discharge during the melting process and also in order to reduce the influence of the alternating magnetic field of the inductive heating coil upon the electron source to an inconsequential value, it is advisable to install the electron source at a sufficiently large distance from the crucible and also to surround the induction coil by a magnet yoke.

According to another preferred embodiment of the invention it is possible to omit the need of a special electron source, for example, in the form of an annular heated cathode or an electron gun, by employing the electrons which are emitted from the incandescent consumable electrode for heating the molten metal in the crucible. It is then only necessary to make the usual provisions for preventing the occurrence of a luminous or arc discharge by providing a vacuum pump unit of a sufficient power so as to evacuate the gases emerging from the molten metal as quickly as possible and to maintain during the melting process a sufficiently high vacuum in the melting chamber This embodiment of the invention also has the advantages over the embodiment as first described that it does not require vacuum-tight leadins into the furnace chamber for the cathode or other electron source, and that it also does not require any special focussing means. The melting chamber may also be made considerably smaller than that according to the first embodiment since it is no longer necessary to mount the hot cathode so as to be spaced at a considerable distance from the melting crucible as well as from the induction coil.

In order to accelerate the electrons emitting from the consumable electrode in the direction toward the melted metal in the crucible, the invention further provides a suitable potential distribution according to which a high negative potential is applied upon the consumable electrode and the inductive heating coil, while a ground potential or even a positive potential is applied upon the molten metal in the crucible. For concentrating the electrons on their path toward the molten metal in the crucible, a solenoid is provided around the crucible. This solenoid also produces a stirring effect upon the molten metal.

Figure 2:
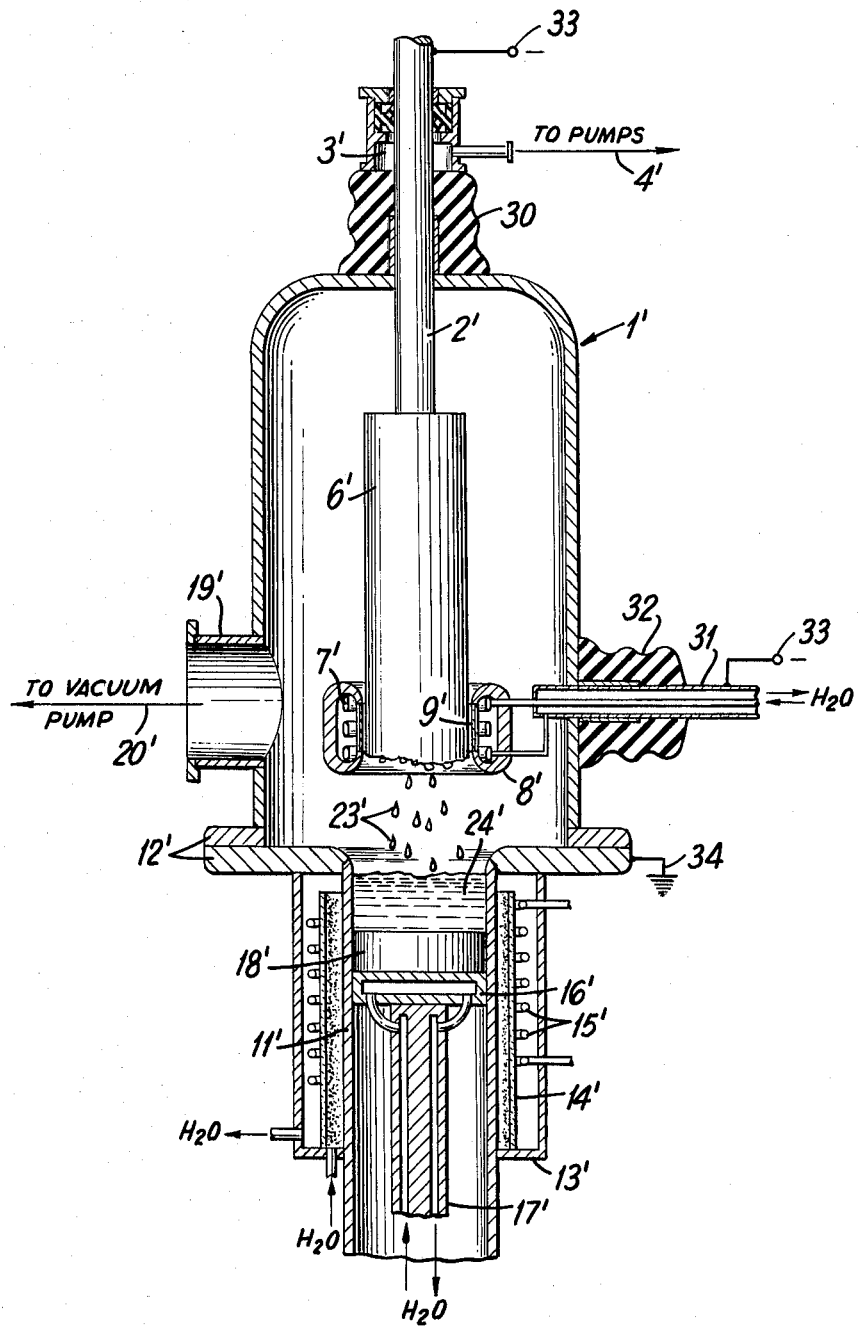

The above-mentioned as well as further objects, features, and advantages of the present invention will become more clearly apparent from the following detailed description thereof, particularly when the same is read with reference to the accompanying drawings, in which:

FIGURE 1 shows diagrammatic cross section of one embodiment of the invention; while FIGURE 2 shows a diagrammatic cross section of a preferred modification of the invention.

Referring first to FIGURE 1 of the drawings, the high-vacuum melting furnace according to the invention comprises a furnace chamber 1 into which an electrode supporting rod 2 is inserted from above in the usual manner by passing through intermediate pressure stages 3, only one of which is shown, which may be evacuated by means of pumps 4 and 5, as indicated diagrammatically. At the lower end of supporting rod 2 a consumable electrode 6 is secured in the usual manner. Furnace chamber 1 has centrally suspended therein a water-cooled inductive heating coil 7 which is surrounded by a water-cooled magnet yoke 8. Between the induction coil 7 and the consumable electrode 6 a water-cooled screen 9 is provided which consists of a heat-resistant material which is electrically as nonconductive as possible and provided on the side facing the electrode 6 with a metallic heat-resistant, heat-ray reflecting mirror coating. Screen 9 is preferably secured to the two ends of the magnet yoke 8. Induction coil 7 and magnet yoke 8 together with screen 9 are mounted within furnace chamber 1 coaxially to the consumable electrode 6 and they are secured by means of supporting pipes 10 which extend vacuum-tight through the wall of chamber 1 and are electrically insulated therefrom. These supporting pipes also serve for the purpose of supplying the necessary electric current to the induction coil 7 as well as the cooling water to this and the other mentioned elements of the inductive heating unit. For securing the consumable electrode 6 to the supporting rod 2 at the beginning of the operation, the electrode is inserted into or placed underneath the open lower end of furnace chamber 1 coaxialy to supporting rod 2, whereupon the supporting rod 2 is lowered and secured in the usual manner to the upper end of the electrode. The supporting rod 2 together with electrode 6 is then drawn upwardly within furnace chamber 1 until only the lower end of the electrode 6 is surrounded by the induction coil 7.

The lower end of furnace chamber 1 is adapted to be secured vacuum-tight to the upper end of a crucible 11 by means of flanges 12 and intermediate gaskets 12a. This is done after the consumable electrode 6 has been secured to supporting rod 2 and been drawn up into the induction unit 7 to 9 in furnace chamber 1. Crucible 11 is water-cooled and for this purpose surrounded by a cooling unit 13 which is preferably provided with an annular partition 14 which consists of a non-magnetizable material on which a solenoid 15 is mounted which serves for concentrating the electrons and for exerting a stirring effect upon the molten metal which is melted off the consumable electrode 6 into crucible 11. The water-cooled bottom plate 16 of crucible 11 is slidably mounted along the vertical wall thereof and secured to the upper end of a plunger 17 which passes vacuum-tight into the crucible and is movable upwardly and downwardly either by mechanical or hydraulic means, not shown. The bottom plate 16 preferably carries a metal block 18 which consists of the same metal as the consumable electrode 6.

Furnace chamber 1 is connected by a large pipe 19 to a high-vacuum pump unit, which is merely indicated by the numeral 20. After the pressure in furnace chamber 1 has been reduced by pump unit 20 to a predetermined value, the induction coil 7 may be switched on to start the melting process.

The apparatus according to the first embodiment of the invention as illustrated in FIGURE 1 comprises an annular cathode 21 and an annular focussing device 22 underneath the same and preferably mounted thereon within the furnace chamber 1. The leadins for cathode 21 are likewise sealed vacuum-tight into the wall of chamber 1.

In the operation of the apparatus, after the consumable electrode 6 has been secured to the supporting rod 2 and the latter has been elevated to place the lower end of the electrode at the proper level with respect to the inductive heating coil 7, and after crucible 11 has been secured to furnace chamber 1 and both have been evacuated by pump unit 20 to the proper high vacuum, the induction coil 7 is switched on to melt the lower end of the consumable electrode 6 which is then continuously advanced in the downward direction at a speed in accordance with the melting procedure. The metal melted off the lower end of the electrode 6 then falls in the form of drops 23 through the annular cathode 21 and focussing device 22 into the crucible 11 and at first upon the metal block 18 where these drops accumulate and start to form a body of molten metal 24 which is fused to the metal block 18, said drops emit electrons having the characteristics emanating from an electron beam.

At the same time or shortly after the induction coil 7 is switched on, the annular cathode 21 is also switched on, and a positive potential is applied upon crucible 11. Cathode 21 is maintained on a potential which is considerably more negative relative to the potential on the crucible so that the electrons emitting from the cathode will be highly accelerated in the direction toward the crucible. The focussing device 22 is likewise provided with a negative potential which is either equal to or still more negative than the potential of the cathode. Such a potential distribution prevents, on the one hand, any electrons from hitting upon and thereby heating the walls of the crucible 11, and, on the other hand, it permits the electrons which emanate from the metal drops 23 to be utilized for also heating the molten metal 24 in crucible 11.

The surface of the molten metal 24 in crucible 11 is always maintained at substantially the same level and thus at the same distance from cathode 21, and for this purpose plunger 17 is gradually lowered accordingly.

The embodiment of the invention as illustrated in FIGURE 1 may be modified in numerous ways. Thus, for example, as previously mentioned, instead of employing an annular cathode, electron generators may be used.

The second and more preferred embodiments of the invention, as illustrated in FIGURE 2, is principally similar both in structure and in operation to the first embodiment according to FIGURE 1, except that the heated annular cathode 21 or a special electron generator, as well as the focussing means 22 are omitted. Those parts in FIGURE 2 which are similar to those as already described with reference to FIGURE 1 are identified by the same numerals to which an apostrophe is added. The furnace chamber 1' has again an electrode supporting rod 2' inserted therein, extending from the outside through pressure stages 3', only one of which is shown, and which are connected to vacuum pump units, indicated by an arrow 4', and then through a high-tension insulator 30 so as to be sealed vacuum-tight and to be electrically insulated relative to the walls of furnace chamber 1'. Supporting rod 2' again carries on its lower end a consumable electrode 6' which is secured thereto at the beginning of the operation and is then drawn upwardly by the supporting rod into furnace chamber 1' until merely its lower end is surrounded by the inductive heating coil 7', whereupon the crucible 11' is secured vacuum-tight to the lower end of furnace chamber 1' by flanges 12'.

Crucible 11' and the parts therein and surrounding the same are similar to those described with reference to FIGURE 1 and their structure and operation therefore do not need to be further described.

Furnace chamber 1' of FIGURE 2 is likewise connected by a suction pipe 19' to a high-vacuum pump unit 20' to be evacuated thereby. When the pressure in furnace chamber 1' has been reduced to a predetermined value, the inductive heating coil 7' is switched on to start the melting process.

The induction coil 7' of FIGURE 2 is likewise water-cooled and surrounded by a magnet yoke 8', and a water-cooled screen 9' of a heat-resistant and substantially nonconductive material is likewise provided between the induction coil 7' and the consumable electrode 6', and this screen 9', which is also preferably provided with a reflective coating of a heat-resistance metal, is also preferably secured to the opposite ends of magnet yoke 8'.

Since in this embodiment of the invention the electrons themselves which are emitting from the heated consumable electrode 6' are utilized for heating the molten metal 24' in crucible 11', there is no longer any need for a separate electrone source in the form of an annular cathode 21 as shown in FIGURE 1 or of one or more electron generators, nor for the focussing means 22. Since due to the omission of the annular cathode there is also no longer any need for maintaining a relatively large distance between the induction coil 7' and the cathode and also between the latter and the crucible 11', the furnace chamber 1' may either be made considerably lower than the furnace chamber 1 according to FIGURE 1 or, if made of the same size, a longer consumable electrode may be mounted therein on supporting rod 2'.

The inductive heating unit 7' to 9' is mounted on and supplied with current as well as with a coolant through a coaxial leadin 31 which passes through the side wall of furnace chamber 1' and is sealed vacuum-tight in a high-tension insulator 32 which is secured to the outside of furnace chamber 1'.

The consumable electrode 6' and the induction coil 7' are preferably supplied with an equal negative potential 33, while crucible 11' is placed on a ground potential or a positive potential 34, so that the electrons which are emitting from the hot consumable electrode 6' will be accelerated in the direction toward the crucible 11' in which they will be concentrated toward the molten metal 24 by the magnetic field which is produced by selenoids 15'. The electrons which are emitting from the falling metal drops 23' will also contribute to the heating of the molten metal 24' in crucible 11'.

The method and apparatus according to the invention attain the important advantages over similar methods and apparatus which were previously known that, due to the additional heating of the inductively molten metal of the consumable electrode by an electron bombardment in a high vacuum, the ingots produced have a very homogenous structure free of cavities and impurities, that these ingots are therefore immediately available for further mechanical treatments, and that they are almost completely degassed and have a high degree of purity and ductility. Still another very important advantage of the invention is the fact that it considerably reduces the usual costs of melting metals in a high vacuum.

The new method and apparatus are especially suitable for melting such metals as titanium, zirconium, niobium, tentalum, molybdenum, tungsten, and the like.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A method of melting consumable electrodes in a high vacuum to refine and degas the same comprising the steps of continuously feeding and melting the lower end of a consumable electrode by heating the same by induction and collecting the resultant molten metal drops in a cold crucible, to form an ingot and simultaneously heating said metal collected in said crucible to form an ingot, said crucible being in connection with a positive potential, by subjecting its free surface to an electron bombardment, said electron bombardment being conducted intermediate said consumable electrode and said crucible.

2. A method as defined in claim 1, in which said electron bombardment heat said metal in said crucible at least to the melting temperature of said metal.

3. A method of melting consumable electrodes in a high vacuum, comprising the steps of continuously advancing a consumable electrode in a downward direction through an inductive heating coil so as to melt the same and thereby continuously melting off the lower end of said electrode in the form of molten metal drops, collecting said resultant metal drops falling from said electrode in a crucible containing a metal block therein of the same metal of the consumable electrode to form a metal body, and heating said body in said crucible at least to the melting temperature thereof by an electron bombardment produced by the electrons emitting from said consumable electrode, said metal in said crucible being in connection with a positive electrical potential with respect to the electrons emitting from the electrode.

4. A method as defined in claim 3, in which said electron bombardment is concentrated so as to hit solely upon the surface of the metal in said crucible and not upon the walls of the crucible.

5. A method as defined in claim 3, in which said electron bombardment in the direction toward said crucible is produced by applying a high negative potential upon said consumable electrode and the inductive heating coil surrounding the same, and a substantially positive potential and at least a ground potential upon said crucible.

6. An apparatus for melting metals to degas the same in a high vacuum comprising a furnace chamber, a crucible, means for connecting said crucible to the open lower end of said furnace chamber to close the same, a consumable electrode in said chamber adapted to be inserted into said chamber, means for raising and gradually lowering said electrode within said chamber, under vacuum conditions, means for evacuating said chamber when said crucible is connected thereto, at least one induction coil surrounding the free terminal portion of said electrode to melt the same, means for supplying an electric current to said induction coil surrounding the electrode for successively melting the lower end of said electrode in the form of metal drops while said electrode is lowered in said chamber, said crucible being adapted to receive said drops and to collect the same to form a metal body in said crucible, a positive electrical potential for the crucible for accelerating the electrons emitted from the electrode toward the metal in the crucible, and an electron source for directing an electron bombardment upon said body to heat the same at least to the melting temperature thereof to further eliminate any gaseous impurities that may be occluded in said metal.

7. An apparatus as defined in claim 6, further comprising means for gradually lowering said metal body in said crucible so that the upper surface of said body remains at a substantially uniform distance from said electron source during the entire melting operation.

8. An apparatus as defined in claim 6, in which said electron source comprises said consumable electrode in the heated condition and the electrons emanate therefrom.

9. An apparatus as defined in claim 8, further comprising means for applying a high negative potential upon said induction coil and said consumable electrode, and for applying a positive ground potential upon said crucible.

10. An apparatus as defined in claim 6, further comprising magnetic means surrounding said crucible for concentrating the electrons accelerated toward the molten metal in said crucible and for stirring the same.

11. An apparatus as defined in claim 10, further comprising a jacket forming a cooling chamber surrounding said crucible, said magnetic means being mounted within said cooling chamber and means for supplying a coolant into said cooling chamber.

12. An apparatus as defined in claim 11, further comprising a partition of a nonmagnetizable material mounted within said cooling chamber, said magnetic means comprising a solenoid mounted on said partition.

13. An apparatus for melting and refining metals in a high vacuum to substantially eliminate occluded gaseous impurities comprising a furnace chamber, a crucible, means for connecting said crucible to the open lower end of said furnace chamber to close the same, a consumable electrode adapted to be inserted into said chamber, means for raising and gradually lowering said electrode within said chamber, means for evacuating said chamber when said crucible is connected thereto, at least one induction coil surrounding said electrode, means for supplying an electric current to said induction coil for successively melting the lower end of said electrode in the form of metal drops while said electrode is lowered, said crucible containing a metal block at the bottom thereof for accumulating said drops, and being adapted to receive said drops and to collect the same to form a metal body in said crucible said metal drops fusing with said block, means for applying a negative potential upon said induction coil and said consumable electrode, such that said electrode is more negative than the potential of said crucible, and an electrical potential in connection with said crucible and being positive with respect to the consumable electrode.

References Cited by the Examiner

UNITED STATES PATENTS

| | | | |
|---|---|---|---|
| 2,573,319 | 10/1951 | Dreyfus et al. | 75—10 |
| 2,686,864 | 8/1954 | Wroughton et al. | 75—10 X |
| 2,688,169 | 9/1954 | Gruber et al. | 75—65 X |
| 2,727,936 | 12/1955 | Boyer | 75—10 X |
| 2,866,700 | 12/1958 | Bohnet et al. | 75—10 |
| 2,880,483 | 4/1959 | Hanks et al. | 22—73 X |
| 2,963,530 | 12/1960 | Hanks et al. | 22—57.2 X |
| 2,981,823 | 4/1961 | Candidus | 75—65 |
| 2,997,760 | 8/1961 | Hanks et al. | 22—57.2 X |
| 3,005,246 | 10/1961 | Murphy et al. | 75—10 |
| 3,087,211 | 4/1963 | Howe | 22—57.2 |

FOREIGN PATENTS

| | | |
|---|---|---|
| 202,041 | 5/1956 | Australia. |
| 1,100,200 | 2/1961 | Germany. |

DAVID L. RECK, *Primary Examiner.*

WINSTON A. DOUGLAS, MARCUS U. LYONS,
*Examiners.*